United States Patent
Fukunaga et al.

(10) Patent No.: US 7,454,902 B2
(45) Date of Patent: Nov. 25, 2008

(54) TORQUE CONVERTER

(75) Inventors: Takao Fukunaga, Yawata (JP); Yasunori Kunisaki, Osaka (JP)

(73) Assignee: Exedy Corporation, Osaka (JP)

( * ) Notice: Subject to any disclaimer, the term of this patent is extended or adjusted under 35 U.S.C. 154(b) by 178 days.

(21) Appl. No.: 10/589,695

(22) PCT Filed: Feb. 23, 2005

(86) PCT No.: PCT/JP2005/002919

§ 371 (c)(1),
(2), (4) Date: Aug. 16, 2006

(87) PCT Pub. No.: WO2005/085679

PCT Pub. Date: Sep. 15, 2005

(65) Prior Publication Data

US 2007/0169470 A1    Jul. 26, 2007

(30) Foreign Application Priority Data

Mar. 8, 2004   (JP)   ............... 2004-063688

(51) Int. Cl.
*F16D 33/00*   (2006.01)
(52) U.S. Cl. ............... 60/361; 60/330; 60/366
(58) Field of Classification Search ............... 60/330, 60/361, 364, 365, 366, 367
See application file for complete search history.

(56) References Cited

U.S. PATENT DOCUMENTS

| | | | | |
|---|---|---|---|---|
| 5,241,820 A | * | 9/1993 | Fukunaga et al. | ............ 60/361 |
| 6,447,246 B1 | * | 9/2002 | Abe et al. | ............ 415/187 |
| 6,575,276 B2 | * | 6/2003 | Fukunaga et al. | ............ 192/3.29 |
| 6,807,808 B2 | * | 10/2004 | Okada et al. | ............ 60/361 |
| 6,880,330 B2 | * | 4/2005 | Okada et al. | ............ 60/367 |

FOREIGN PATENT DOCUMENTS

| | | |
|---|---|---|
| JP | 11-051148 A | 2/1999 |
| JP | 2002-147563 A | 5/2002 |
| JP | 2002-544448 A | 12/2002 |
| JP | 2003-021219 A | 1/2003 |
| JP | 2003-154862 A | 5/2003 |

* cited by examiner

*Primary Examiner*—Michael Leslie
(74) *Attorney, Agent, or Firm*—Global IP Counselors, LLP

(57) ABSTRACT

A torque converter 1 is a device for transmitting torque by fluid, and includes a front cover 14, an impeller 18, a turbine 19, and a stator 20. The impeller 18, the turbine 19 and the stator 20 constitute a fluid operating chamber 6 having a torus shape. Flattening (L/D1) is less than or equal to 0.18, wherein D1 is an outer diameter of the fluid operating chamber 6 and L is the axial direction length of the fluid operating chamber 6. In the impeller shell 22, a surface 22*a* on which the impeller blades 23 are fixed has an impeller straight portion 22*b* showing a straight line in a cross section. In the turbine shell 25, a surface 25*a* on which the turbine blades 26 are fixed has a turbine straight portion 25*b* showing a straight line in a cross section.

17 Claims, 2 Drawing Sheets

TORQUE CONVERTER

TECHNICAL FIELD

The present invention is related to a torque converter, particularly to a torque converter that is extremely flattened.

BACKGROUND ART

A torque converter includes a torus having three types of vane wheels (an impeller, a turbine, and a stator) and serves to transmit torque by fluid in the torus. The impeller forms a fluid chamber filled with operating oil with the front cover. The impeller is mainly made of an annular impeller shell, a plurality of impeller blades fixed to an inner surface of the impeller shell, and an annular impeller core fixed to the inner ends of the impeller blades. The turbine is disposed in the interior of the fluid chamber opposing the impeller in the axial direction. The turbine is mainly made of an annular turbine shell, a plurality of turbine blades fixed to a surface of the turbine shell facing the impeller, and an annular turbine core fixed to the inner ends of the turbine blades. A radially inner portion of the turbine shell is fixed to a flange of a turbine hub by a plurality of rivets. The turbine hub is non-rotatably coupled to a main drive shaft of the transmission. The stator regulates the flow of the operating oil that is returned from the turbine to the impeller. The stator is disposed between radially inner portions of the impeller and the turbine. The stator is mainly made of an annular stator shell, a plurality of stator blades formed on an outer circumference of the stator shell, and an annular stator core formed on tips of the stator blades. The stator is supported by a stator shaft via a one-way clutch.

In general, a torque converter can smoothly accelerate and decelerate because power is transmitted by fluid. However, a loss of energy can be caused by fluid slip resulting in poor fuel economy. Therefore, a torque converter that is mounted with a lock-up device to connect mechanically an input-side front cover and an output-side turbine exists among prior art torque converters. The lock-up device is disposed in a space between the front cover and the turbine. The lock-up device is mainly formed of a disc-shaped piston, a driven plate, and torsion springs. The disc-shaped piston can be frictionally engaged with the front cover. The driven plate is mounted to a back face side of the turbine. The torsion springs elastically connect the piston and the driven plate in a rotating direction. An annular frictional member is adhered to the piston so that it faces a flat frictional face of the front cover (refer to Unexamined Patent Publication 2003-56669, for example).

DISCLOSURE OF INVENTION

Recently, due to the limited space, it has been strongly requested that torque converters be flattened further. In addition, since lock-up devices have been employed and the size has become larger as mentioned before, it is especially requested that the torus be further flattened. However, if the torus is further flattened, the performance of the torque converter may deteriorate.

It is an object of the present invention to reduce deterioration in the fluid operation performance of the torque converter having a torus that is further flattened.

According to a first aspect of the present invention, a torque converter for transmitting torque by fluid includes a front cover, an impeller, a turbine, and a stator. The front cover receives torque. The impeller forms a fluid chamber with the front cover, and includes an impeller shell and a plurality of impeller blades fixed to the impeller shell. The turbine is located facing the impeller within the fluid chamber, and includes a turbine shell and a plurality of turbine blades fixed to the turbine shell. The stator is located between the impeller and the turbine, and adjusts the flow of the fluid from the turbine to the impeller. The impeller, the turbine, and the stator constitute a torus. In the torus, flattening (L/D1) is less than or equal to 0.18, wherein D1 is an outer diameter and L is an axial-direction length. A surface of the impeller shell on which the impeller blades are fixed has an impeller straight portion showing a straight line in a cross section. A surface of the turbine shell on which the turbine blades are fixed has a turbine straight portion showing a straight line in a cross section.

In this torque converter, since the impeller straight portion and the turbine straight portion are provided, the fluid operation performance is unlikely to deteriorate, although flattening (L/D1) is less than or equal to 0.18.

A torque converter according to a second aspect of the present invention is the torque converter of the first aspect, wherein the impeller straight portion is formed at a radially intermediate portion of the impeller shell. The turbine straight portion is formed at a radially intermediate portion of the turbine shell.

In this torque converter, the outlet radius of the turbine can be shortened, so that torque ratio in a high-speed ratio range becomes higher, thereby improving the efficiency. In addition, the radius of the outlet and inlet of the stator can be shortened, so that the capacity coefficient in the high-speed ratio range becomes higher.

A torque converter according to a third aspect of the present invention is the torque converter of the first or second aspect, wherein the impeller straight portion and the turbine straight portion extend perpendicular to a rotational axis of the torque converter. In other words, the impeller straight portion and the turbine straight portion compose annular flat surfaces having a width in the radial direction.

A torque converter according to a fourth aspect of the present invention is the torque converter of any of the first to the third aspects, wherein a ratio (St/L) is in the range between 0.1 and 0.7, L being an axial direction length of the torus and St being a length of the turbine straight portion.

In this torque converter, the ratio is within the range as mentioned above, the efficiency and the capacity coefficient are sufficiently high.

A torque converter according to a fifth aspect of the present invention is the torque converter of any of the first to the fourth aspects, wherein the length Si of the impeller straight portion is more than or equivalent to the length St of the turbine straight portion.

In this torque converter, due to the length Si of the impeller straight portion, the fluid operation performance is unlikely to deteriorate. The reason is that the pressure at the radially outer portion of the impeller does not become high so that the flow loss does not increase.

A torque converter according to a sixth aspect of the present invention is the torque converter of the fifth aspect, wherein the length Si of the impeller straight portion is at least 1.15 times the length St of the turbine straight portion.

In this torque converter, since the length Si of the impeller straight portion is adequately long, the fluid operation performance is unlikely to deteriorate.

In the torque converter according to the present invention, the fluid driving performance is unlikely to deteriorate, although the torus is further flattened.

Figure 1:
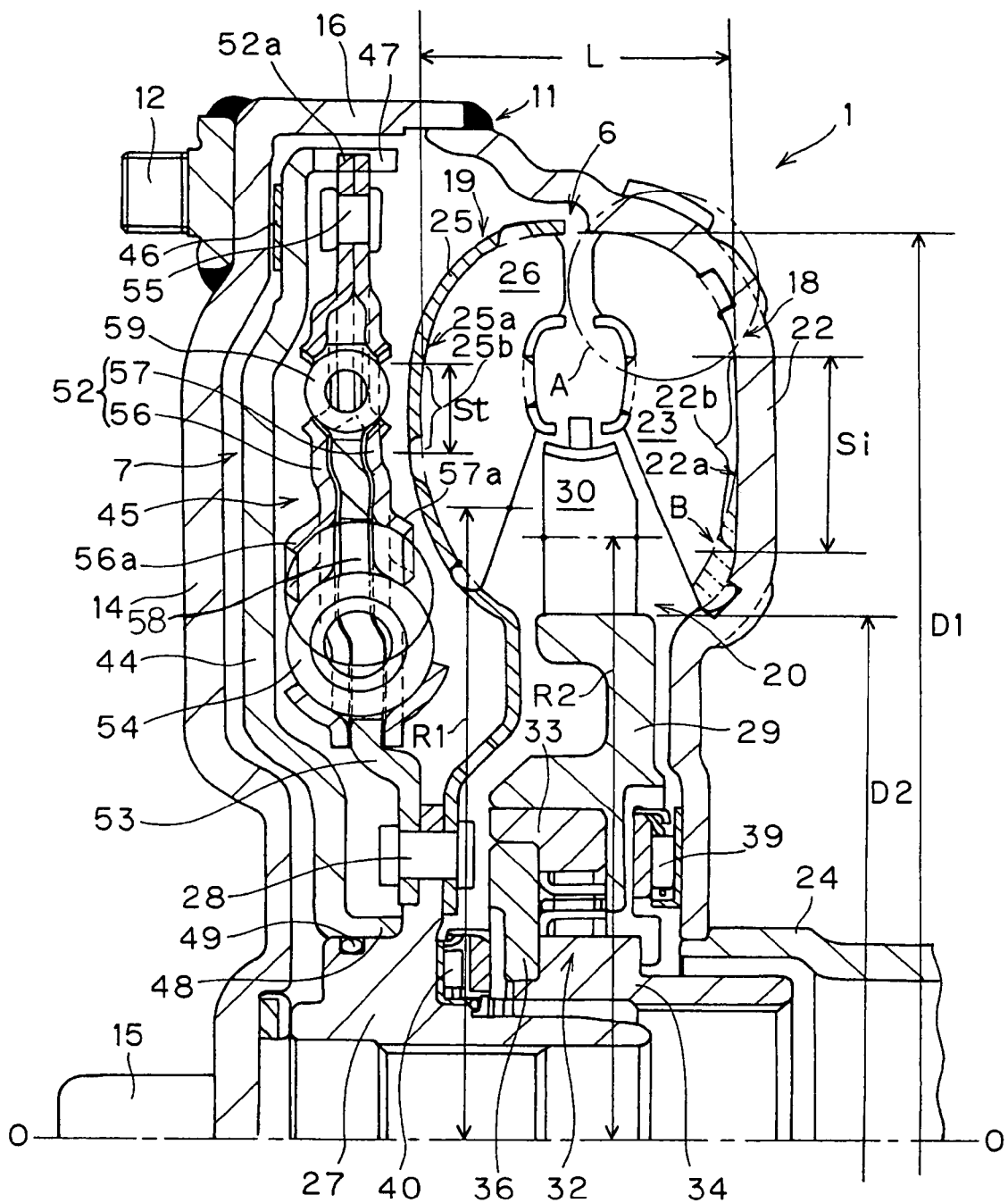
FIG. 1 is a longitudinal cross-sectional diagram of a torque converter according to one embodiment of the present invention.

EXPLANATIONS OF LETTERS OR NUMERALS 1 torque converter
6 fluid operating chamber (torus)
18 impeller
19 turbine
20 stator
22 impeller shell
22b impeller straight portion
25 turbine shell
25b turbine straight portion

BEST MODE FOR CARRYING OUT THE INVENTION (1) Structure

FIG. 1 is a longitudinal cross sectional diagram of a torque converter 1 in which an embodiment of the present invention is employed. The torque converter 1 is a device to transmit torque from a crankshaft of the engine to an input shaft of the transmission (not shown). The engine (not shown) is located on the left side of FIG. 1, and the transmission (not shown) is located on the right side of FIG. 1. The line O-O shown in FIG. 1 is a rotational axis of the torque converter 1.

The torque converter 1 is mainly made of a fluid operating chamber (torus) 6 having a torus shape formed by three kinds of vane wheels including an impeller 18, a turbine 19, and a stator 20. The torque converter 1 also includes a lock-up device 7.

1) Fluid Operating Chamber

The front cover 14 is a disc-like member that is located adjacent a flexible plate. A center boss 15 by welding is fixed to a radially inner portion of the front cover 14. The center boss 15 is an axially extending cylindrical member that is inserted in a center recess of the crankshaft. A plurality of bolts 12 spaced apart at substantially equal distance around the circumference for fixing the flexible plate is located around the radially outer portion and on the engine-side of the front cover 14.

At the radially outer portion of the front cover 14, a radially outer cylindrical portion 16 extends toward the transmission in the axial direction. An outer periphery of an impeller shell 22 of the impeller 18 by welding is fixed at a tip of the radially outer cylindrical portion 16. As a result, the front cover 14 and the impeller 18 constitute a fluid chamber 11 filled with an operating oil (fluid). The impeller 18 is mainly made of the impeller shell 22, a plurality of impeller blades 23 fixed to an inner face 22a of the impeller shell 22, and an impeller hub 24 fixed to the radially inner portion of the impeller shell 22.

The turbine 19 is located in the fluid chamber 11 so that it faces the impeller 18 in the axial direction. The turbine 19 is mainly made of a turbine shell 25 and a plurality of turbine blades 26 fixed on an impeller-side surface 25a of the turbine shell 25. The turbine shell 25 has a radially inner portion fixed to a flange of the turbine hub 27 by a plurality of rivets 28. The turbine hub 27 is non-rotatably coupled to the input shaft (not shown).

The stator 20 is a device to adjust the flow of the operating oil returning from the turbine 19 to the impeller 18. The stator 20 is a one-piece member formed of resin, aluminum alloy, or the like by casting. The stator 20 is located between a radially inner portion of the impeller 18 and a radially inner portion of the turbine 19. The stator 20 is mainly made of an annular carrier 29, a plurality of stator blades 30 formed on the outer circumference of the carrier 29, and an annular core fixed to tips of the stator blades 30. The carrier 29 is supported by a fixed shaft (not shown) via a one-way clutch 32.

The one-way clutch 32 is supported by an outer race 33 fixed to the carrier 29 and an inner race 34 fixed to the fixed shaft. A thrust bearing 39 is located between the carrier 29 and the impeller hub 24. On an axial-direction engine side of the outer race 33 of the one-way clutch 32 is located an annular engagement member 36, which prevents components of the one-way clutch 32 from dropping off in the axial direction. A thrust bearing 40 is located between the engagement member 36 and the turbine hub 27.

The surface 22a of the impeller shell 22, on which the impeller blades 23 are fixed, is formed with an impeller straight portion or linearly shaped part 22b having a straight line in a cross section. The surface 25a of the turbine shell 25, on which the turbine blades 26 are formed, is formed with a turbine straight portion or linearly shaped part 25b having a straight line in a cross section. The impeller straight portion 22b and the turbine straight portion 25b extend perpendicular to the rotational axis O-O of the torque converter 1. In other words, the impeller straight portion 22b and the turbine straight portion 25b compose annular flat surfaces having a width in the radial direction.

The impeller straight portion 22b is formed at the radially intermediate portion of the impeller shell 22. The turbine straight portion 25b is formed at the radially intermediate portion of the turbine shell 25. Consequently, both sides of the straight portions 22b and 25b in the radial direction have a shape of smooth curve. The impeller straight portion 22b and the turbine straight portion 25b correspond to each other in the axial direction, i.e., having portions whose positions in the radial direction are the same. In this embodiment, length Si of the impeller straight portion 22b is longer than length St of the turbine straight portion 25b, by about double, for example. It should be noted that "straight line" in this specification indicates a substantially straight line, and includes a situation in which a radius of curvature R of relative to line segments of the turbine straight portion 25a is more than or equal to a half of D1 (the outer diameter of the fluid operating chamber 6), for example.

The position of the radially outer edge of the impeller straight portion 22b is almost the same as that of the radially outer edge of the turbine straight portion 25b. The position of the radially inner edge of the impeller straight portion 22b is displaced radially and inwardly from that of the radially inner edge of the turbine straight portion 25b. In other words, the radially inner portion of the impeller straight portion 22b does not face that of the turbine straight portion 25b in the axial direction. The radially inner portion of the impeller straight portion 22b is a portion having the shape of a straight line, being altered from a curved portion of the impeller shell as B portion shown in chain double-dashed lines in FIG. 1. In summary, in the present embodiment, the enclosed area B that is diagonally shaded by the chain double-dashed lines is replaced with a new part of the flow passage in the impeller. As a result, the blade area of the impeller 18 is increased compared to that of the conventional art. In addition, the inner diameter of the inlet portion of the impeller 18 is larger than that of the conventional art.

Ratio (D2/D1) is 0.58 in the fluid operating chamber 6, which has a shape of torus, wherein D2 is the inner diameter and the D1 is the outer diameter. It should be noted that the inner diameter D2 is a diameter of a circle that corresponds to the outer circumference of the carrier 29 of the stator 20, and the outer diameter D1 is a diameter of a circle that corresponds to the radially outermost portion of the impeller 18 or the turbine 19 (the outermost peripheries of the blades at the outlet of the impeller 18 or the inlet of the of the turbine 19). The ratio means that if the outer diameter D1 is the same order as that of the conventional art, the inner diameter D2 is sufficiently increased. Accordingly, a space is ensured at a radially inner portion of the fluid operating chamber 6 to locate torsion springs 54 of the lock-up device 7 (described later). Preferably, D2/D1 is in the range of 0.50 to 0.77. One of the reasons is that if D2/D1 were equal to or more than 0.77, the flow passage area in the torus would be very small, so that the flow rate acting on the blades would decrease and the torque capacity of the impeller would be reduced. Furthermore, the maximum efficiency of the torque converter would deteriorate because the outlet radius R1 of the turbine 19 would increase.

In this torque converter 1, the axial direction length is reduced dramatically compared to that of the conventional art. Specifically, the fluid operating chamber 6 is further flattened, flattening (L/D1), a ratio of the axial direction L of the fluid operating chamber 6 relative to the outer diameter D1 of the fluid operating chamber 6, is about 0.17, preferably less than or equal to 0.18. This means that if the outer diameter D1 of the torus were to have the same order of magnitude as the conventional one, the axial dimension L would be shortened dramatically. It should be noted that the axial-direction length L of the fluid operating chamber 6 indicates a distance between the farthest portion of the inner side of the impeller shell 22 toward the transmission and the farthest portion of the inner side of the turbine shell 25 of the turbine 19 toward the engine.

2) Lock-up Device

Next, a description will be made on the lock-up device 7. The lock-up device 7 is a device to connect mechanically the front cover 14 with turbine 19, and is located between the front cover 14 and the turbine 19 in the axial direction within the fluid chamber 11.

The lock-up device 7 is mainly made of a piston member 44 and a damper mechanism 45. The piston member 44 is a disc-like member that is located adjacent an axial-direction engine side of the front cover 14. The piston member 44 is formed with a radially inner cylindrical portion 48 at a radially inner portion thereof, extending toward the transmission in the axial direction. The radially inner cylindrical portion 48 is supported by the outer circumference of the turbine hub 27 so that the portion 48 can rotate and move in the axial direction relative to the hub 27. It should be noted that the movement of the piston member 44 toward the transmission in the axial direction is limited to a certain position because an axial-direction transmission side end of the radially inner cylindrical portion 48 can abut against the flange of the turbine hub 27. a seal ring 49, which seals a radially inner portion of the piston member 44 between the spaces in the axial direction, is provided around the outer circumference of the turbine hub 27.

The piston member 44 has a radially outer portion that functions as a clutch engagement portion. An annular friction facing 46 is attached to an engine-side of the radially outer portion of the piston member 44. The friction facing 46 is opposed to an annular and flat friction surface formed at the radially outer portion of the front cover 14. The radially outer portion of the piston member 44 is formed with a plurality of projections 47 that extend toward the transmission in the axial direction.

The damper mechanism 45 is made of a drive member 52, a driven member 53, and a plurality of torsion springs 54. The drive member 52 is made of a pair of plate members 56 and 57 located side by side in the axial direction. The pair of plate members 56 and 57 have radially outer portions that are in contact with each other and fixed to each other by a plurality of rivets 55. The pair of plate members 56 and 57 have outer peripheries that are formed with a plurality of projections 52a extending in the radial direction so as to engage with the projections 47. This engagement allows the piston member 44 and the drive member 52 to move relative to each other in the axial direction, but not in the rotational direction. The pair of plate members 56 and 57 have radially inner portions that have a gap in the axial direction therebetween. The radially inner portions of the plate members 56 and 57 are formed with a plurality of first and second support portions 56a and 57a, respectively, being arranged in the circumferential direction. The first and second support portions 56a and 57a are structures that accommodate and support the later described torsion springs 54, and specifically are cut-and-bent portions standing in the axial direction at both ends in the radial direction. The driven member 53 is a disc-like member that is located between the first and second plate members 56 and 57 in the axial direction, having a radially inner portion fixed to the flange of the turbine hub 27 by the rivets 28. The driven member 53 is formed with window holes 58 that correspond to the first and second support portions 56a and 57a. The window hole 58 is a hole that extends in the circumferential direction. The torsion spring 54 is accommodated within a set of the window hole 58 and the first and second support portions 56a and 57a. The torsion spring 54 is preferably a coil spring that extends in the circumferential direction, and has both ends in the circumferential direction to be supported by circumferential ends of the window hole 58 and the first and second support portions 56a and 57a. In addition, the torsion spring 54 is supported by the cut-and-bent portions of the first and second support portions 56a and 57a for limited axial travel. It should be noted that the damper mechanism 45 further includes torsion springs 59 to realize a stopper torque.

As described above, since the inner diameter D2 of the fluid operating chamber 6 is larger than before, it is possible to prepare the torsion springs 54 to have a coil diameter larger than that of conventional torsion springs. Specifically, the position in the axial direction of the axial-direction transmission side edge of the torsion springs 54 is nearer to the transmission in the axial direction than the axial position of the portion nearest to the engine of the outer surface of the turbine shell 25, and than the portion nearest to the engine (the turbine straight portion 25b) of the inner face 25a of the turbine shell 25. As a result, it is easy to improve performance of the torsion springs 54. As a result, it is really possible to use fluid torque transmission by the fluid operating chamber 6 of the torque converter 1 only at the start of the vehicle and then to use the torque converter 1 in a mechanical torque transmission state in which the lock-up device 7 is coupled.

(2) Operation

When the torque is transmitted from the engine (not shown) to the crankshaft, the torque is transmitted via the flexible plate to the front cover 14 and the impeller 18. The operating oil is driven by the impeller blades 23 of the impeller 18 to rotate the turbine 19. The torque of the turbine 19 is output via the turbine hub 27 to the input shaft (not shown).

The operating oil, flowing from the turbine 19 to the impeller 18, flows through the stator 20 toward the impeller 18.

When the operating oil in a space between the front cover 14 and the piston member 44 is drained radially inwardly, due to a hydraulic pressure difference, the piston member 44 moves toward front cover 14, and the friction facing 46 is pressed against the friction surface of the front cover 14. As a result, the torque is transmitted from the front cover 14 via the lock-up device 7 to the turbine hub 27. Since the performance of the torsion springs 54 is improved as described above, the torsional vibrations can be sufficiently reduced even if the lock-up engagement is performed from a low-speed range.

(3) Effects

In this torque converter 1, although the flattening (L/D1) is less than or equal to 0.18, the performance of the fluid operation of the torque converter 1 is unlikely to be reduced since the impeller straight portion 22b and the turbine straight portion 25b are provided. Especially, since the impeller straight portion 22b is formed at the radially intermediate portion of the impeller shell 22 and the turbine straight portion 25b is formed at the radially intermediate portion of the turbine shell 25, the outlet radius R1 of the turbine 19 can be decreased. Consequently, direction of the operation oil going into the stator 20 is changed so that torque ratio in the high-speed ratio range is high, thereby improving the efficiency. Additionally, the inlet and outlet radius R2 of the stator 20 can be shortened, so that the capacity in the high-speed ratio range can be higher.

Figure 2:
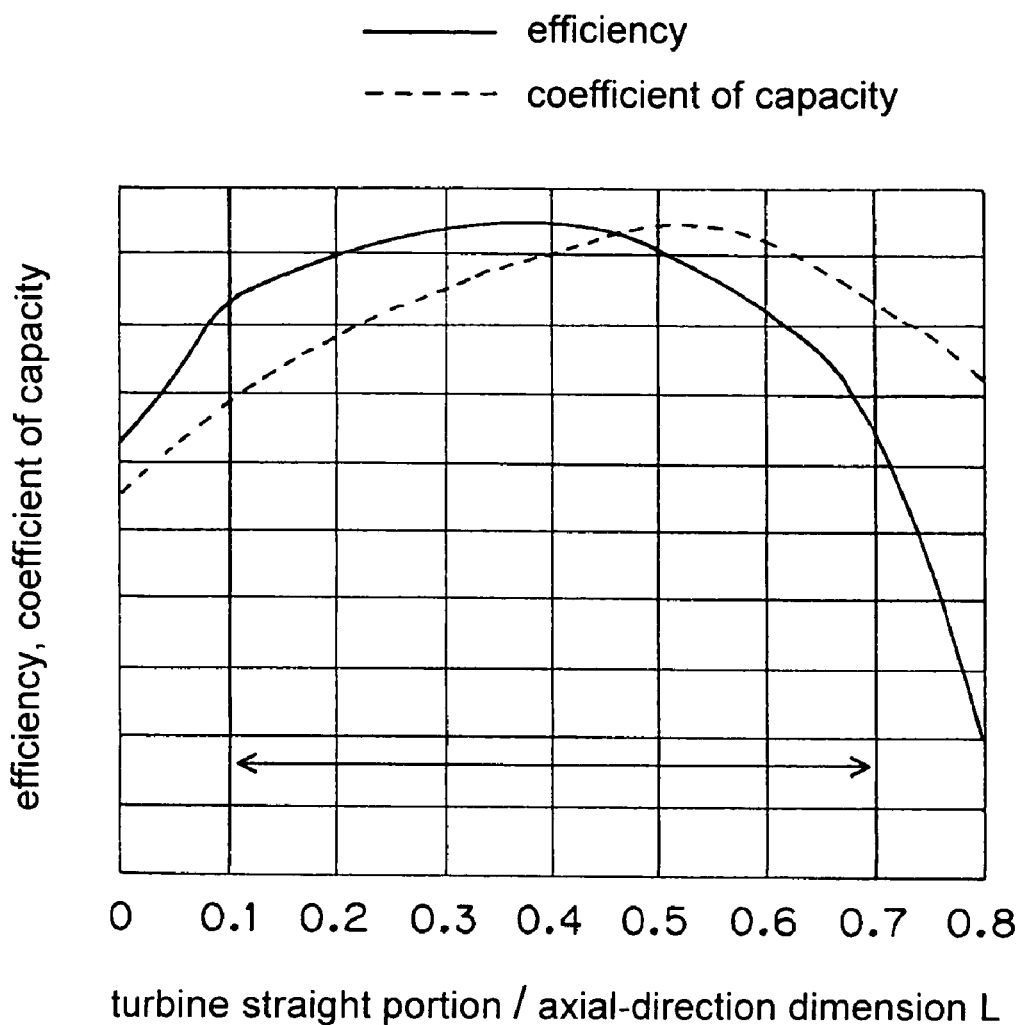
FIG. 2 is a view of showing changes of efficiency and capacity coefficient relative to "turbine straight portion length/torus axial direction length."

In the torque converter 1, ratio (St/L), a ratio of length St of the turbine straight portion 25b relative to axial direction length L of the fluid operating chamber 6 is 0.29. If the ratio (St/L) is in the range of 0.1 to 0.7, the efficiency and the capacity coefficient are sufficiently high, as shown in the graph of FIG. 2. Furthermore, if the ratio (St/L) is in the range of 0.2 to 0.6, the efficiency and the capacity coefficient are sufficiently high.

Since the length Si of the impeller straight portion 22b is adequately long, the performance is unlikely to deteriorate. The reason is that the pressure at the radially outer portion of the impeller 18 (circle A portion in FIG. 1) does not become high so that the flow loss does not increase. If the length Si of the impeller straight portion 22b is more than or equivalent with the length St of the turbine straight portion 25b, the operating oil can flow smoothly from the radially intermediate portion to the outlet of the impeller 18 because the blade area in the impeller 18, corresponding to the area that is diagonally shaded by chain double-dashed lines, increases. As a result, the capacity coefficient becomes higher over the whole speed ratio range. Preferably, the length Si of the impeller straight portion 22b is at least 1.15 times length St of the turbine straight portion 25b.

The present invention is not limited to the above-described embodiments, and various modifications and amendments are possible without departing the scope and sprit of the present invention.

INDUSTRIAL APPLICABILITY

The present invention is applicable to a torque converter of the vehicle.

The invention claimed is:

1. A torque converter to transmit torque by fluid, comprising:
   a front cover being configured to receive torque;
   an impeller forming a fluid chamber with said front cover and including an impeller shell and a plurality of impeller blades fixed to said impeller shell;
   a turbine being located facing said impeller within said fluid chamber, including a turbine shell and a plurality of turbine blades fixed to said turbine shell; and
   a stator being located between said impeller and said turbine to adjust the flow of the fluid from said turbine to said impeller,
   said impeller, said turbine, and said stator constituting a torus,
   flattening L/D1 being less than or equal to 0.18 in said torus, wherein D1 is an outer diameter and L is an axial direction length,
   a surface of said impeller shell on which said impeller blades are fixed having an impeller straight portion showing a straight line in a cross section, and
   a surface of said turbine shell on which said turbine blades are fixed having a turbine straight portion showing a straight line in a cross section, and
   a ratio St/L being in the range between 0.1 and 0.7, L being an axial direction length of said torus and St being a length of said turbine straight portion.

2. A torque converter according to claim 1, wherein
said impeller straight portion is formed at a radially intermediate portion of said impeller shell, and
said turbine straight portion is formed at a radially intermediate portion of said turbine shell.

3. A torque converter according to claim 2, wherein
said impeller straight portion and said turbine straight portion extend perpendicularly to a rotational axis of said torque converter.

4. A torque converter according to claim 3, wherein
a length of said impeller straight portion is more than or equivalent to said length St of said turbine straight portion.

5. A torque converter according to claim 4, wherein
said length of said impeller straight portion is longer than or equal to 1.15 times said length St of said turbine straight portion.

6. A torque converter according to claim 2, wherein
a length of said impeller straight portion is more than or equivalent to said length St of said turbine straight portion.

7. A torque converter according to claim 6, wherein
said length of said impeller straight portion is longer than or equal to 1.15 times said length St of said turbine straight portion.

8. A torque converter according to claim 1, wherein
said impeller straight portion and said turbine straight portion extend perpendicularly to a rotational axis of said torque converter.

9. A torque converter according to claim 8, wherein
a length of said impeller straight portion is more than or equivalent to a length St of said turbine straight portion.

10. A torque converter according to claim 9, wherein
said length of said impeller straight portion is longer than or equal to 1.15 times said length St of said turbine straight portion.

11. A torque converter according to claim 1, wherein
a length of said impeller straight portion is more than or equivalent to said length St of said turbine straight portion.

12. A torque converter according to claim 11, wherein
said length of said impeller straight portion is longer than or equal to 1.15 times said length St of said turbine straight portion.

13. A torque converter, comprising:

a front cover being configured to receive torque;

an impeller forming a fluid chamber with said front cover and including an impeller shell and a plurality of impeller blades fixed to said impeller shell;

a turbine being located facing said impeller within said fluid chamber, including a turbine shell and a plurality of turbine blades fixed to said turbine shell; and a stator being located between said impeller and said turbine to adjust the flow of the fluid from said turbine to said impeller, said impeller, said turbine, and said stator constituting a torus, flattening L/D1 being less than or equal to 0.18 in said torus, wherein D1 is an outer diameter and L is an axial direction length, a surface of said impeller shell on which said impeller blades are fixed having an impeller straight portion showing a straight line in a cross section, a surface of said turbine shell on which said turbine blades are fixed having a turbine straight portion showing a straight line in a cross section, a length of said impeller straight portion being more than or equivalent to 1.15 times a length St of said turbine straight portion.

14. A torque converter according to claim 13, wherein said impeller straight portion is formed at a radially intermediate portion of said impeller shell, and said turbine straight portion is formed at a radially intermediate portion of said turbine shell.

15. A torque converter according to claim 14, wherein said impeller straight portion and said turbine straight portion extend perpendicularly to a rotational axis of said torque converter.

16. A torque converter according to claim 13, wherein said impeller straight portion is formed at a radially intermediate portion of said impeller shell, and said turbine straight portion is formed at a radially intermediate portion of said turbine shell.

17. A torque converter according to claim 16, wherein said impeller straight portion and said turbine straight portion extend perpendicularly to a rotational axis of said torque converter.

* * * * *